(No Model.)

B. H. KEMBLE.
WHEEL HUB AND LUBRICATOR.

No. 249,060.  Patented Nov. 1, 1881.

Witnesses:
A. P. Grant,
W. F. Kircher

Inventor:
Bushrod H. Kemble,
by John A. Wiedersheim
ATTORNEY.

UNITED STATES PATENT OFFICE.

BUSHROD H. KEMBLE, OF PHILADELPHIA, PENNSYLVANIA, ASSIGNOR OF ONE-THIRD TO DANIEL S. KRIEBLE, OF SAME PLACE.

WHEEL-HUB AND LUBRICATOR.

SPECIFICATION forming part of Letters Patent No. 249,060, dated November 1, 1881.

Application filed March 11, 1881. (No model.)

To all whom it may concern:

Be it known that I, BUSHROD H. KEMBLE, a citizen of the United States, residing in the city and county of Philadelphia, State of Pennsylvania, have invented a new and useful Improvement in Wheel-Hubs and Lubricators, which improvement is fully set forth in the following specification and accompanying drawings, in which—

Figure 1:
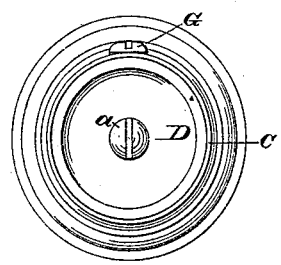
Figure 2:
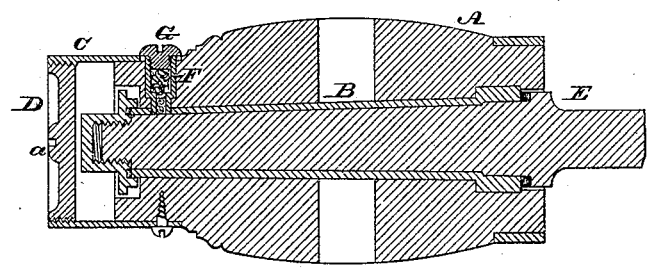

Figure 1 is a front view of a wheel-hub embodying my invention. Fig. 2 is a longitudinal section thereof.

Similar letters of reference indicate corresponding parts in the two figures.

This invention relates to lubricating devices for wagon-axles; and it consists in the construction and combination of devices hereinafter set forth and claimed.

Referring to the drawings, A represents a wheel-hub, B the box, and C the outer band thereof, the latter projecting beyond the edge of the hub.

D represents a cap, which is of the form of a plate or disk, which is circumferentially threaded and fitted to the interiorly-threaded portion of the band C at the outer end thereof. It will be seen that the cap D and band C form a closed chamber for the nut $a$, and prevent sand and dirt generally reaching the axle E and nut $a$. When access is required to the nut or axle the cap D is unscrewed or removed, thus exposing the nut. The closed chamber as formed also serves to retain the lubricant which escapes from the axle, and prevent dropping or loss thereof, the opening of the cap, however, permitting the collection or discharge of said lubricant.

F represents a lubricant chamber or reservoir, formed of a tube, which is fitted in an opening in the hub and box, so as to open on the journal of the axle E, and cause the lubricant in the reservoir to reach the said journal, the reservoir being partly occupied with wicking or packing, if desired. The reservoir is applied to near the outer end of the hub, so that when the oil or lubricant reaches the axle-journal it flows around the same toward what is the bottom of the box B, whereby, owing to the inclined direction of the journal, the highest point being toward the outer end, the oil flows or runs down the journal, and so lubricates the length thereof.

The closing screw-cap G of the reservoir F prevents escape of the lubricant, and the reservoir is so disposed that said screw-cap G tightens against the band C, and serves, with a screw on the opposite portion of the hub, to hold the band securely in position.

In applying my invention to vehicles already constructed it is only necessary to bore the hub and box and fit in the lubricating-tube, and the end of the band may be cut with a screw-thread to have a closing-cap, D, applied to it.

Having thus described my invention, what I claim as new, and desire to secure by Letters Patent, is—

The screw-cap G, in combination with reservoir F, band C, hub A, axle E, and box B, said screw-cap G serving both as a fastening device for said band and a stopper for said reservoir.

BUSHROD H. KEMBLE.

Witnesses:
JOHN A. WIEDERSHEIM,
W. F. KIRCHER.